United States Patent Office 3,509,776
Patented May 5, 1970

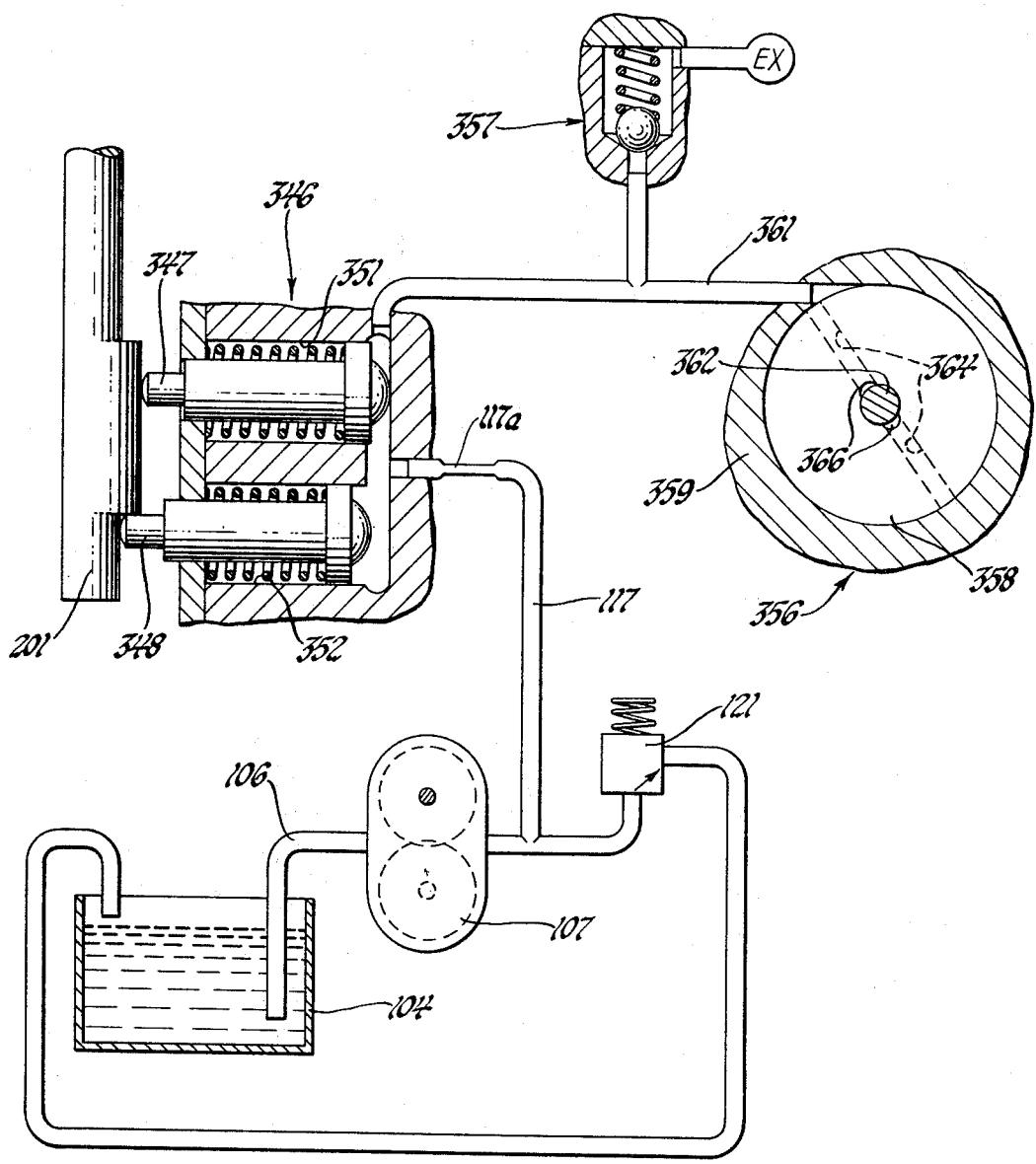

3,509,776
BIDIRECTIONAL FLUID SPEED SENSOR
Robert H. Schaefer, Westfield, Ind., assignor to General Motors Corporation, Detroit, Mich., a corporation of Delaware
Original application Mar. 10, 1965, Ser. No. 438,634, now Patent No. 3,378,119, dated Apr. 16, 1968. Divided and this application Sept. 20, 1967, Ser. No. 678,471
Int. Cl. G01p *3/26*
U.S. Cl. 73—521   1 Claim

ABSTRACT OF THE DISCLOSURE

A speed signal device for use with a vehicle transmission in both the forward and reverse direction. The device includes a rotatable drum having a pair of radial passages to a central exhaust port. Fluid at the periphery of the drum flows through the radial passages to exhaust at a decreasing rate as the drum speed increases thereby increasing the pressure of the fluid at the periphery proportional to increase in drum speed.

---

This application is a division of application Ser. No. 438,634, filed Mar. 10, 1965, now U.S. Pat. No. 3,378,119.

This invention relates to governors and more particularly to rotatable governors which are operable in two directions of rotation.

It is an object of this invention to provide an improved rotatable governor for providing a speed signal in both a forward and reverse direction of rotation.

Another object of this invention is to provide a governor having an outer peripheral chamber in fluid communication with a pressure source, an inner exhaust passage and a radial passage connecting the outer periphery and the inner exhaust passage whereby zero rotation of the drum permits the outer periphery to be freely exhausted and increasing drum speed decreases the flow rate to exhaust thereby increasing the pressure at the outer periphery of the drum.

These and other objects of the invention will be more apparent from the following description and drawing of the preferred embodiment thereof.

The single figure of the drawing is a schematic view of the preferred embodiment of the invention.

Referring to the drawing, there is shown a fluid pump 107 which draws fluid from a reservoir 104 through a suction line 106 and delivers fluid through a main line passage 117 to a restricted passage 117a. The fluid pressure in main line passage 117 is controlled by a relief valve 121.

The restricted passage 117a is in fluid communication through a forward-reverse shift inhibitor 346 to a governor line 361 which, in turn, is connected to a governor 356. The forward-reverse shift inhibitor 346 has a forward spring biased plunger 347 and a reverse spring biased plunger 348 slidably disposed in bores 351 and 352 respectively. The plungers 347 and 348 are adapted to engage a manual shift valve 201. For a more complete description of the shift inhibitor 346, the manual valve 201 and the control system in which they are particularly useful, reference may be had to U.S. Pat. 3,378,119.

The shift inhibitor 346 is actuated by the exhaust controlling governor 356 which has a drum 358 enclosed in a housing 359 with the outer periphery of the drum 358 and the inner periphery of the housing 359 in sealing relation. The housing 359 is connected with the governor line 361 tangentially to the drum 358. The drum 358 is connected to a shaft 362 which is adapted to be driven by the output shaft of a transmission (not shown). The drum 358 has a single diameter radial passage 364 connecting the outer periphery of the drum adjacent the housing 359 which passage is connected to exhaust passages 366 extending axially through the drum 358 parallel to and adjacent the shaft 362 to provide a continuous exhaust of fluid from the governor line 361.

As the drum 362 is increased in speed in either a forward or reverse direction, the flow of fluid through passages 364 to exhaust will decrease due to the centrifugal pressure developed by the speed of the drum thereby increasing the pressure in governor line 361. A relief valve 357 is provided to control the maximum governor pressure which relief valve may be eliminated if it is desirable to have the governor pressure signal continually increase throughout the entire speed range of the governor.

The restricted branch line 117a controls the maximum fluid flow from the main line 117 into the governor line 361. This restricted passage 117a is provided so that main line pressure can be maintained at a high level to provide actuation of other devices such as clutches and brakes in the transmission.

I claim:
1. In a governor for measuring the speed of an element in a forward and reverse direction of rotation, a fixed housing having a cylindrical chamber therein, a source of fluid pressure connected through a passage having a restriction therein to the outer perimeter of said cylindrical chamber, a drum fitting closely within said chamber adapted to be driven at a rotary speed proportional to the speed of said element in both a forward and reverse direction, a straight single diameter passage substantially on a radius in said drum open at the outer perimeter to said chamber and at the inner end adjacent the axis of rotation of said drum connected freely to exhaust to provide a governor pressure increasing proportional to speed, during forward and reverse rotation of said element, in said chamber at the outer perimeter and said passage to said restriction.

References Cited
UNITED STATES PATENTS
2,877,783   3/1959   Hobbs _____ 137—31
FOREIGN PATENTS
572,340   3/1959   Canada.
627,236   9/1927   France.
838,646   3/1939   France.

JAMES J. GILL, Primary Examiner